April 24, 1951 R. WALSH 2,550,505
RAILWAY VEHICLE CENTER BEARING
Filed Dec. 22, 1945 2 Sheets-Sheet 1
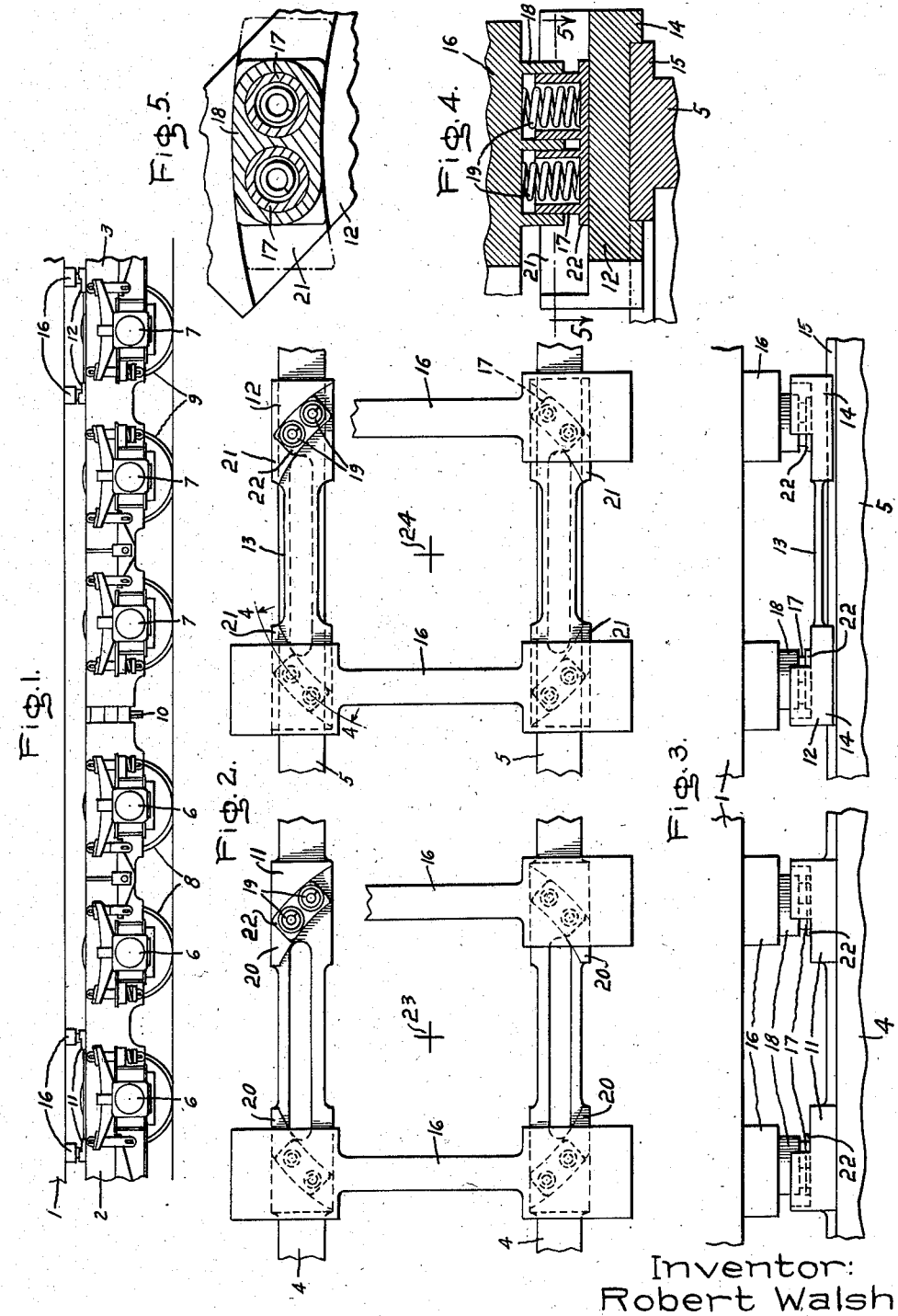
Inventor:
Robert Walsh,
by Prowell S. Mack
His Attorney.

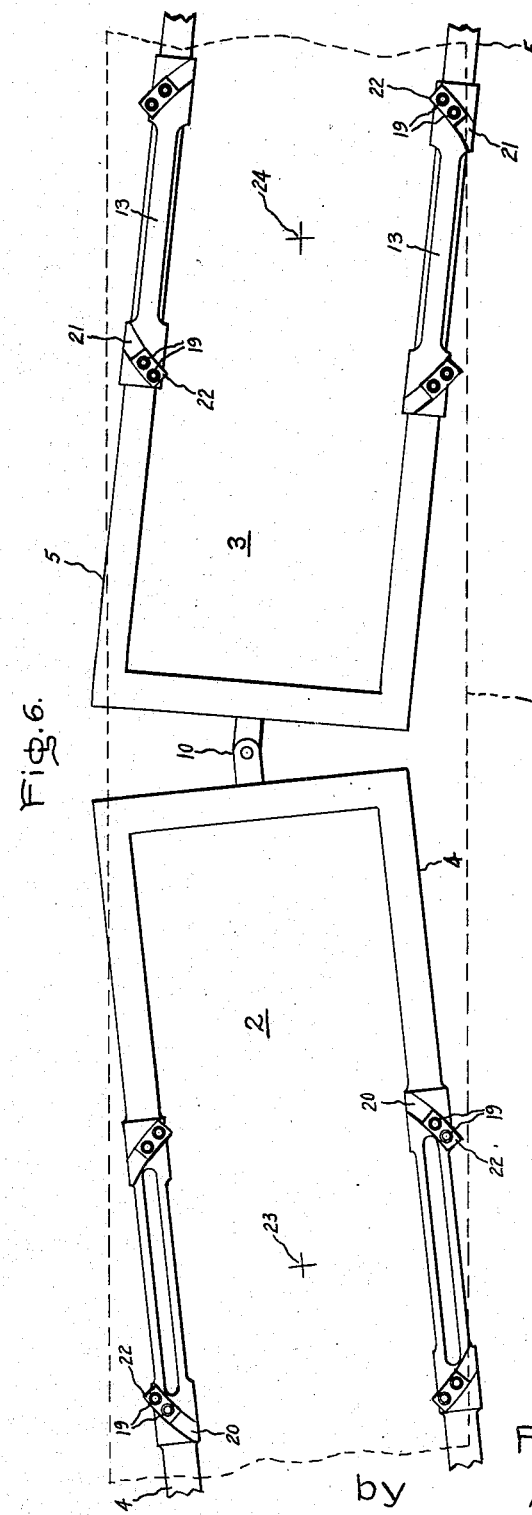

Patented Apr. 24, 1951

2,550,505

UNITED STATES PATENT OFFICE 2,550,505

RAILWAY VEHICLE CENTER BEARING

Robert Walsh, Erie, Pa., assignor to General Electric Company, a corporation of New York Application December 22, 1945, Serial No. 636,872

8 Claims. (Cl. 105—175)

My invention relates to railway vehicle center bearing constructions and particularly to such a construction which may be formed as sections mounted on the side frames of the vehicle trucks to provide for better utilization of the space between the side frames for driving equipment.

An object of my invention is to provide an improved railway vehicle center bearing.

Another object of my invention is to provide an improved sectional center bearing for railway vehicles in which the center bearings are mounted on the side frames of the vehicle trucks.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view of a part of a railway vehicle frame and main truck provided with an embodiment of my invention; Fig. 2 is a plan view of the two center bearings shown in Fig. 1 with the frame of the vehicle partly broken away to show the relative arrangement of the center bearings and bearing plates on the vehicle truck frame; Fig. 3 is a side elevational view showing parts of the truck and the vehicle frame, together with the bearings shown in Fig. 2; Fig. 4 is an enlarged sectional view taken along line 4—4 of Fig. 2 which represents the general construction of my improved segmental bearings and bearing plate; Fig. 5 is a cross-sectional view of one center bearing segment taken along the line 5—5 of Fig. 4; and Fig. 6 is a vertical view of the railway vehicle frame and center bearings showing the trucks in the pivoted position.

Referring to the drawing, I have shown an embodiment of my invention applied to a railway vehicle, such as a locomotive, provided with a main supporting frame 1 and main trucks 2 and 3 having side frames 4 and 5 on which sectional center bearings and bearing plates are arranged for supporting the locomotive frame 1. Any suitable spring rigging may be provided for mounting the truck frames 4 and 5 on the supporting axles 6 and 7, on which drive wheels 8 and 9 are mounted. The two trucks 2 and 3 are of the articulated type connected together at their adjacent ends by any suitable articulating connection 10. Each of the two sectional center bearings comprises four segmental bearing plates 11 and 12 respectively having arcuate bearing guides or grooves 20 and 21 formed thereon arranged around centers 23 and 24 on the longitudinal center line of the vehicle. As is more clearly shown in Fig. 1, these center bearings are longitudinally spaced apart so that each bearing is adapted to transmit part of the weight of the locomotive to each of the main driving trucks. One of the sets of bearing plates 11 is rigidly secured in any suitable manner, as by welding, to the side frames 4 of one of the main trucks 2, while the center bearing plates 12 on the other main truck 3 are secured together into pairs on each side of the vehicle by suitable tie bars 13 and are formed with track engaging portions 14 slidably arranged on tracks 15 formed on the side frames 5 of the main truck 3 to provide for guiding the bearing plates 12 for movement longitudinally of the vehicle to allow for adjustment of the longitudinal distance between the two center bearings of the vehicle as may be required when the vehicle traverses curves in the road. Both ends of the locomotive frame 1 include transoms 16 supported on the segmental bearing plates by a plurality of sectional center bearing members each comprising a plurality of telescopically arranged members 17 and 18, as shown in detail in Figs. 4 and 5, which are biased apart by compression loading coil springs 19. The springs 19 engage journal plates 22 which are slidably positioned in the bearing guides or grooves 20 and 21. Thus the bearing members serve to guide the pivotal movement of the truck with respect to the vehicle frame 1, to provide for resiliently supporting the vehicle on the center bearings and to provide a resilient load equalizing system on each of the four segmental bearing plates providing for an even distribution of the load on both sides of the main trucks. Referring now to Fig. 6, there is shown the positions assumed by the sectional center bearings when the trucks 2 and 3 are pivoted. It will be readily apparent that the longitudinal distance between the centers 23 and 24 is fixed even though the trucks 2 and 3 have pivoted about the articulated joint 10 since the members 18 are secured to the frame 1. Because of the fixed longitudinal distance between the centers 23 and 24, the tie bars 13 with their track engaging portions 14 have slid along the track portions 15 on the side frames 5. Since the relative positions of the sectional center bearing members including the telescopic members 17 and 18, the springs 19, and the journal plates 22 are fixed with relation to the transoms 16 and frame 1, pivotal movement of the trucks 2 and 3 will cause the sectional bearing members to slide to new positions in the bearing guides or grooves 20 and 21, as shown in Figs. 5 and 6, thus guiding the pivotal movement of the trucks with respect to the frame. It will be seen that even with the trucks pivoted, the vehicle is still supporting since each sectional center bearing member is still substantially bearing on the side frames. This construction also provides for cushioning of shocks which may tend to be transmitted to the locomotive through the center bearings from the main driving trucks. If desired, these center bearing members may be formed solid, or may include only a single telescopically arranged member, although it is considered that a plurality of resilient cushioning springs as illustrated provides an easier riding construction and assures a better distribution of load on the different center bearing segments.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A railway vehicle truck center bearing comprising four segmental arcuate bearing guides arranged around a common center on the longitudinal center line of the truck forming a sectional center bearing, said sectional center bearing being adapted to be slidably supported on the side frames of said vehicle truck for permitting limited longitudinal movement of said bearing relative to said truck, sectional bearing members secured to the vehicle frame and respectively arranged in sliding engagement with said bearing guides for supporting the vehicle thereon and for guiding the pivotal movement of said truck with respect to said vehicle frame, each of said bearing members comprising a plurality of telescopically arranged members with compression loading coil springs arranged therein for resiliently biasing apart said telescopically arranged members to provide a resilient load equalizing system on said four segmental bearing guides.

2. A railway vehicle having a frame and a pair of trucks connected by an articulated joint, each of said trucks having a sectional center bearing comprising four segmental arcuate bearing guides arranged around a center on the longitudinal center line of the vehicle, said center bearings being longitudinally spaced apart, tracks on one of said trucks for slidably supporting the bearing guides of one of said center bearings, said bearing guides of said one bearing having track engaging portions for guiding said bearing guides for limited movement longitudinally of said one truck whereby the longitudinal distance between the centers of said center bearings remains fixed when said trucks pivot about said articulated joint, the other of said sectional center bearings being rigidly mounted on the other of said trucks, and sectional bearing members respectively arranged in sliding engagement with said bearing guides for supporting the vehicle thereon and for guiding the pivotal movement of said trucks with respect to said vehicle frame.

3. A railway vehicle truck center bearing comprising four segmental arcuate bearing guides arranged around a common center on the longitudinal center line of the truck forming a sectional center bearing, tracks on said truck for slidably supporting said bearing guides, said bearing guides having track engaging portions for guiding said bearing guides for limited movement longitudinally of said truck, a plurality of sectional bearing members secured to the vehicle frame and respectively arranged in sliding engagement with said bearing guides for supporting said vehicle and for guiding the pivotal movement of said truck with respect to said vehicle, each of said bearing members comprising telescopically arranged members with loading springs arranged for resiliently biasing apart said telescopically arranged members to provide a resilient load equalizing system on said four segmental bearing guides.

4. A railway vehicle having a frame and a pair of trucks with side frames connected by an articulated joint, each of said trucks having a sectional center bearing comprising four segmental arcuate bearing guides arranged around a center on the longitudinal center line of said frame, said center bearings being longitudinally spaced apart, means for permitting limited longitudinal movement of one of said center bearings with respect to its truck whereby the longitudinal distance between the centers of said center bearings remains fixed when said trucks pivot about said articulated joint, a plurality of sectional bearing members respectively arranged in sliding engagement with said bearing guides for supporting said vehicle thereon and for guiding the pivotal movement of said trucks with respect to said vehicle frame, each of said bearing members comprising telescopically arranged members with loading springs arranged for resiliently biasing apart said telescopically arranged members to provide a resilient load equalizing system on said segmental bearing guides.

5. A sectional center bearing for a railway vehicle having a wheeled truck comprising four segmental bearing plates with arcuate bearing guides formed thereon arranged around a common center on the longitudinal center line of said truck, tracks on said truck for supporting said bearing plates, means for securing together into pairs bearing plates on each side of each truck, said pairs of bearing plates having track engaging portions for guiding said bearing plates for limited movement longitudinally of said truck, a plurality of sectional bearing members secured to the frame of said vehicle and respectively arranged in sliding engagement with said bearing guides for supporting said vehicle thereon and for guiding the pivotal movement of said truck with respect to said vehicle frame, each of said bearing members comprising telescopically arranged members with compression loading coil springs arranged therein for resiliently biasing apart said telescopically arranged members to provide a resilient load equalizing system on said segmental bearing plates.

6. A railway vehicle having a frame and a pair of main trucks with side frames connected by an articulated joint, each of said trucks having a sectional center bearing comprising four segmental bearing plates with arcuate bearing guides formed thereon arranged around a center on the longitudinal center line of said vehicle, said center bearing being longitudinally spaced apart, means for supporting said bearing plates on the side frames of said main trucks, means for allowing limited longitudinal movement of one of said center bearings with respect to its truck whereby the longitudinal distance between the centers of said center bearings remains fixed when said trucks pivot about said articulated joint, a plurality of sectional bearing members secured to said vehicle frame and respectively arranged in sliding engagement with said bearing guides for supporting said vehicle thereon and for guiding the pivotal movement of said trucks with respect to said frame, each of said bearing members comprising telescopically arranged members with compression loading coil springs arranged therein for resiliently biasing apart said telescopically arranged members to provide a resilient load equalizing system on said segmental bearing plates.

7. A railway vehicle having a frame and a pair of main trucks with side frames connected by an articulated joint, each of said trucks having a sectional center bearing comprising four segmental bearing plates with arcuate bearing guides formed thereon arranged around the center of a longitudinal center line of said vehicle, said center bearings being longitudinally spaced apart, tracks on said side frames of one of said trucks for supporting the bearing plates of one of said center bearings, means for securing together into pairs the bearing plates of said one center bearing on each side of said vehicle on said tracks, said pairs of bearing plates having track engaging portions for guiding said bearing plates for limited movement longitudinally of said one truck whereby the longitudinal distance between the centers of said center bearings remains fixed when said trucks pivot about said articulated joint, the other of said sectional center bearings being rigidly secured to the side frames of the other of said main trucks, and a plurality of sectional bearing members secured to said vehicle frame and respectively arranged in sliding engagement with said bearing guides for supporting said vehicle thereon and for guiding the pivotal movement of said trucks with respect to said vehicle frame.

8. A railway vehicle having a frame and a pair of main trucks with side frames connected by an articulated joint, each of said trucks having a sectional center bearing comprising four segmental bearing plates with arcuate bearing guides formed thereon arranged about a center on the longitudinal center line of said vehicle, said center bearing being longitudinally spaced apart, tracks on said side frames of one of said trucks for supporting the bearing plates of one of said center bearings, means for securing together into pairs said bearing plates of said one center bearing on each side of said vehicle on said tracks, said pairs of bearing plates having track engaging portions for guiding said bearing plates for limited movement longitudinally of said one truck whereby the longitudinal distance between the centers of said center bearings remain fixed when said trucks pivot about said articulated joint, the other of said sectional center bearings being rigidly secured to the side frames of the other of said main trucks, a plurality of sectional bearing members secured to said vehicle frame and respectively arranged in sliding engagement with said bearing guides for supporting the vehicle thereon and for guiding the pivotal movement of said trucks with respect to said vehicle frame, each of said bearing members comprising a pair of telescopically arranged members with compression loading coils arranged therebetween for resiliently biasing apart said telescopically arranged members to provide a resilient load equalizing system on said segmental bearing plates.

ROBERT WALSH.

REFERENCES CITED

The following references are of record in the file of this patent:

UNITED STATES PATENTS

| Number | Name | Date |
| --- | --- | --- |
| 927,386 | Vauclain | July 6, 1909 |
| 1,466,590 | Kelley | Aug. 28, 1923 |
| 1,529,791 | Jablow | Mar. 17, 1925 |